Figure 1:
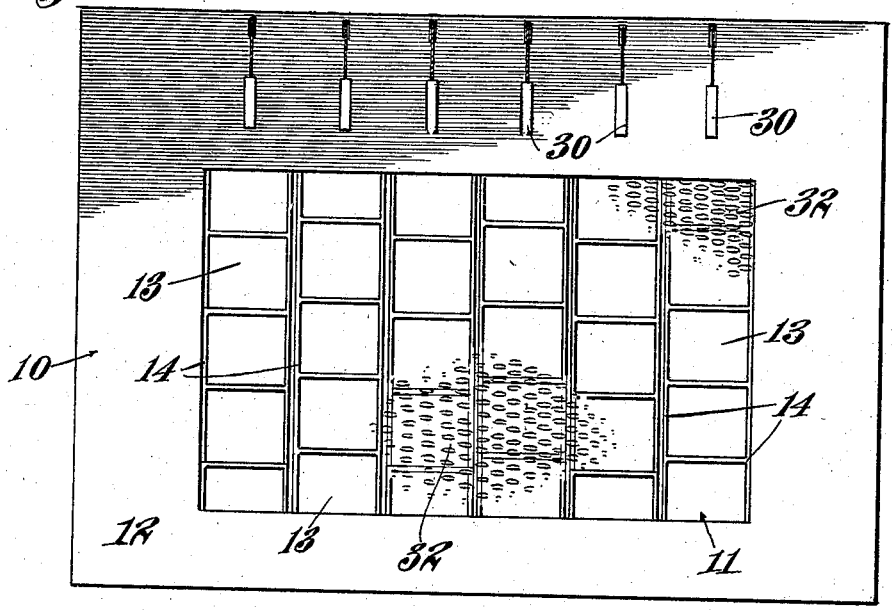

No. 867,562. PATENTED OCT. 1, 1907.
J. W. FAWKES.
ADVERTISING DEVICE.
APPLICATION FILED JUNE 25, 1906.

3 SHEETS—SHEET 1.

Witnesses
Inventor
Joseph W. Fawkes
By Hazard & Harpham
Attorneys.

No. 867,562. PATENTED OCT. 1, 1907.
J. W. FAWKES.
ADVERTISING DEVICE.
APPLICATION FILED JUNE 25, 1906.
3 SHEETS—SHEET 2.
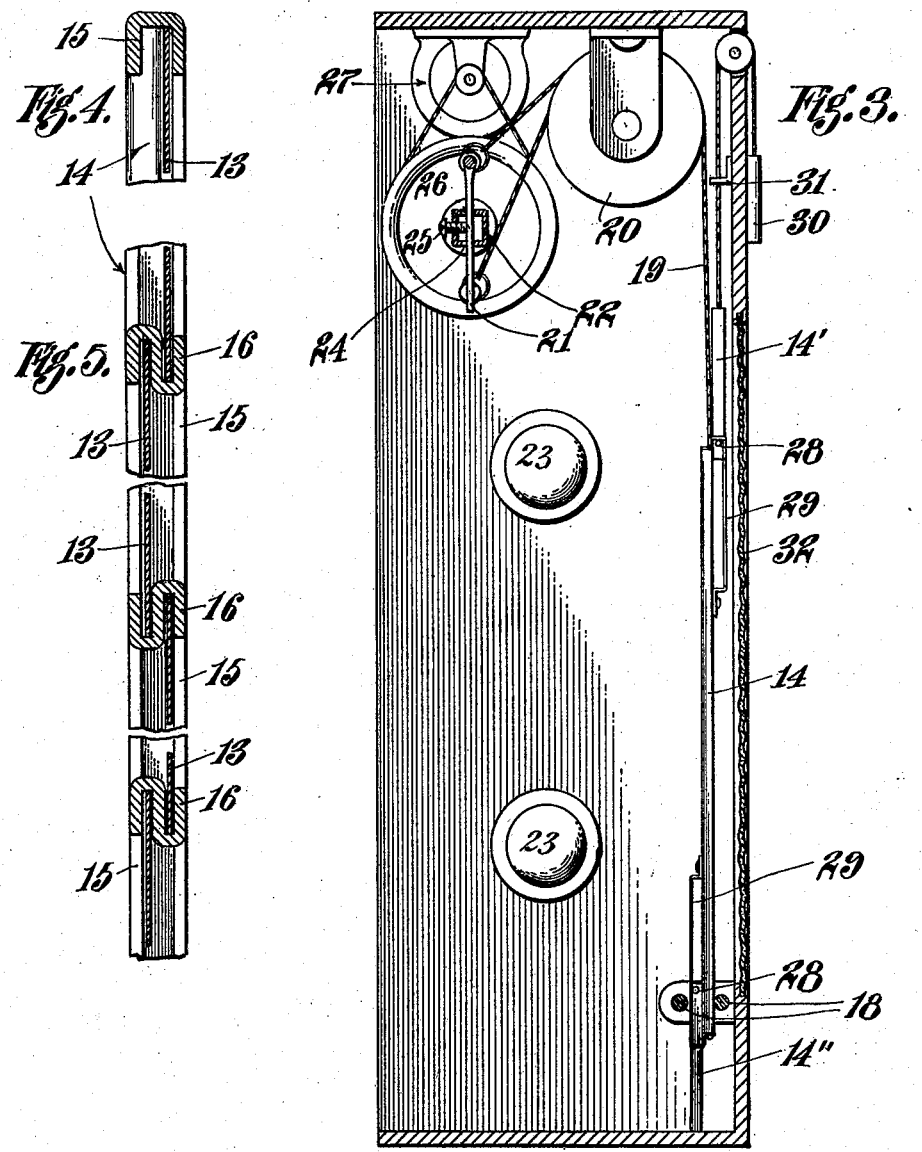
Witnesses
Inventor
Joseph W. Fawkes
By Hazard & Harpham
Attorneys.

No. 867,562. PATENTED OCT. 1, 1907.
J. W. FAWKES.
ADVERTISING DEVICE.
APPLICATION FILED JUNE 25, 1906.
3 SHEETS—SHEET 3.
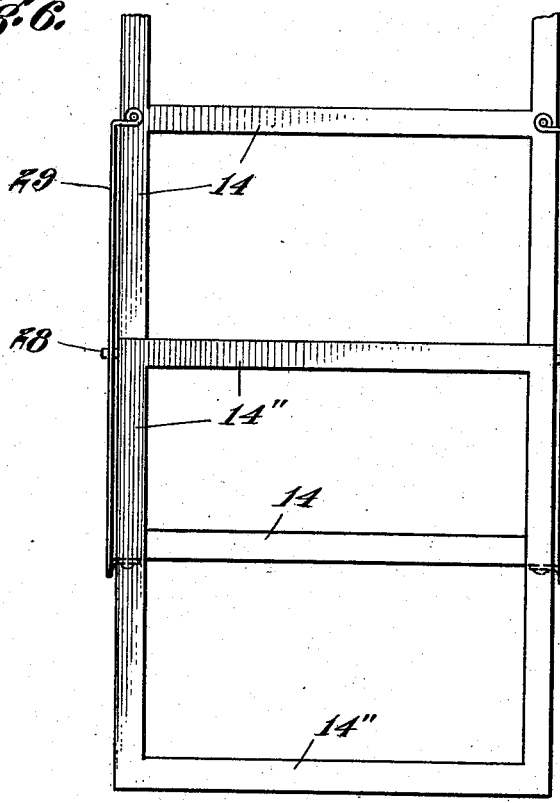
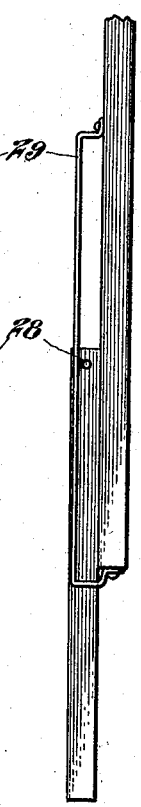
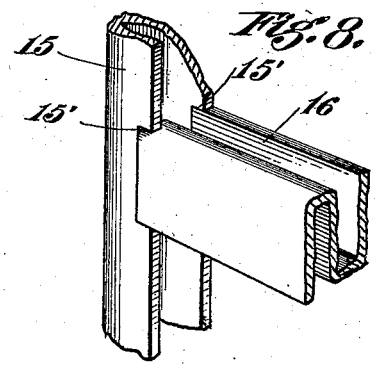

UNITED STATES PATENT OFFICE.

JOSEPH WESLEY FAWKES, OF LOS ANGELES, CALIFORNIA.

ADVERTISING DEVICE.

No. 867,562.  Specification of Letters Patent.  Patented Oct. 1, 1907.

Application filed June 25, 1906. Serial No. 323,187.

*To all whom it may concern:*

Be it known that I, JOSEPH WESLEY FAWKES, a citizen of the United States, residing at Los Angeles, in the county of Los Angeles and State of California, have invented new and useful Improvements in Advertising Devices, of which the following is a specification.

My invention relates to improvements in that class of advertising devices in which a movement of the display surfaces is used for conspicuity.

It is an object of my invention to so arrange the several parts of the operating mechanism and the frames which hold the display surfaces that they balance each other, thus reducing to a minimum the power required to drive the device.

It is also an object of my invention to provide a novel pictorial effect.

It is also an object of my invention to provide means whereby the display surface may be made a maximum without enlarging the other parts of the device.

It is also an object of my invention to provide a simple and efficient frame for holding the display surfaces.

It is also an object of my invention to so arrange the display surfaces and their operating mechanisms that the display surfaces may be extended indefinitely in their own plane.

In the drawings I have shown my device as it will be applied inside a case for use in hotel lobbies and the like, but it may be constructed to apply itself to theater curtains, bill boards, exhibition spaces and the like without departing from my invention. I have shown the display surfaces on transparencies but any other form of surface upon which an advertisement or picture may be placed may be used in place of those shown.

I accomplish these objects by the device described herein and illustrated in the accompanying drawings in which:—

Figure 2:
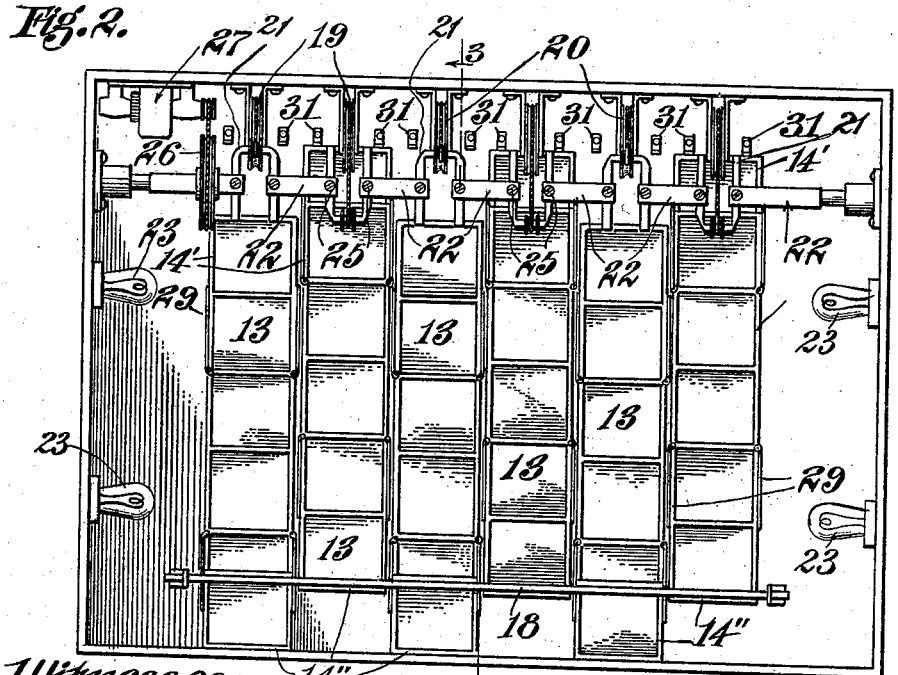

Figure 1—is a front elevation of my improved advertising device. Fig. 2—is a rear elevation of the same. Fig. 3—is an enlarged section on line 3—3 of Fig. 2. Fig. 4—is a horizontal fragmentary section of one of the display frames. Fig. 5.—is a vertical section of the same. Fig. 6.—is a fragmentary rear elevation of one of the display frames and its lower supplementary frame. Fig. 7.—is a side elevation of the same. Fig. 8.—is a detail perspective showing the method of joining the parts of the frames.

10 represents a case provided with a rectangular opening 11 in its front wall 12 through which display surfaces 13 may be viewed.

Display surfaces 13 are held in frames 14, the detail construction of which is more clearly shown in Figs. 4, 5 and 8, and which are composed of longitudinal U-shaped strips 15 and transverse S-shaped strips 16. Strips 16 are secured to strips 15 by forcing strips 16 into notches 15′ cut in strips 15. This construction is clearly shown in Fig. 8. Display surfaces 13, which, in this case, I have shown on transparencies are held between the longitudinal strips 15 in the grooves thereof, and between the S-shaped strips 16 in the grooves thereof. As will be seen in Fig. 5 the transparencies are alternately held at the back and front of the frames by this method of mounting. Frames 14 are made of any suitable length so as to hold any number of transparencies arranged in a vertical line and as many frames may be arranged horizontally as the size of the device for any particular use requires. These transparencies are commonly made of celluloid or similar material and may be sprung into place in the frames.

Rollers 18 are provided to guide the lower ends of the display frames which hang from cords 19 attached to their tops. Cords 19 pass over pulleys 20 and are attached to adjustable cranks 21 on sectional shaft 22 suitably journaled on the case. Shaft 22 is preferably made up of square sections having in their ends slots 24 in which cranks 21 fit and are held therein by set screws 25. The cranks are made of sufficient length to allow of any desired change in their stroke. Pulley 26 is mounted on shaft 22 and receives a belt from a motor 27, mounted in the top of case 10, and is rotated thereby. Cranks 21 are alternately arranged on each side of shaft 22 so that the movements transferred through cords 19 to frames 14 are alternate, two adjacent frames always moving in opposite directions. By this arrangement it will be seen that the frames balance each other and only enough power is required to overcome the friction and inertia of the mechanism.

For the purpose of utilizing to full advantage the space inside the case I have shown frames 14 each provided with a top supplementary frame 14′ and a bottom supplementary frame 14″. These supplementary frames are provided with pins 28 which slide in guides 29 attached to the display frames 14. When a frame 14 travels downwardly supplementary frame 14″ will come into contact with and rest upon the bottom of the case. Frame 14 will continue its downward movement as far as the movement of crank 21 allows and pin 28 will slide upwardly in guide 29. Upon the upward movement of frame 14 pin 28 will slide downwardly in guide 29 until it reaches the bottom of the guide when supplementary frame 14″ will be picked up and carried upwardly during the remainder of the upward movement of the frame 14.

Supplementary frame 14′ is balanced by weight 30 which is just sufficiently heavy to always keep pin 28 in contact with the top of guide 29 except when supplementary frame 14′ contacts with stop 31 attached to the inner face of the front of the case 10. Stop 31 is so placed that when the bottom of supplementary frame 14′ passes above the level of the top of opening 11, in the front of the case, it will contact with the stop. Frame 14 will then continue in its upward movement and on descending again will carry with it supplementary frame 14′ during that part of the movement in which the top of frame 14 is below the top of opening 11. It will be seen that by this construction I am enabled to increase the length of the advertising frame without unduly increasing the height of the case in which it is mounted and without unduly removing the operating mechanism from the frames.

In opening 11 is a plate of glass 32 which is of irregular or wavy cross section as shown in Fig. 3. In its preferred form the glass presents on its faces a staggered series of leaf-like depressions. When the display surfaces 13 are moved behind the glass the pictures and other matter on the advertising surfaces appear to have an undulating movement which is especially effective in the case of representations of water, when an apparent rippling motion is produced. When human beings, animals or vegetation is depicted the effect is to present to the eye a very life-like irregular motion. In Figs. 2 and 3 lights 23 are shown behind the transparencies for the purpose of showing them to full advantage.

It will be seen from the foregoing description that my invention embodies a novel combination of movements which is very effective in attracting attention.

In the use of glass of wavy cross-section I do not restrict myself to any particular form as glass of any irregular cross-section which would cause the refraction of light passing through it would accomplish the same result without departing from the spirit of my invention.

Having described my invention what I claim is:—

1. In an advertising device, a case; frames mounted in the case adapted to hold display surfaces; a sectional shaft mounted in the case; adjustable cranks on the shaft; connecting means between the cranks and the frames; and means to rotate the shaft.

2. In an advertising device, a case; a series of display frames mounted in said case; supplementary frames having slidable connection with said display frames; means adapted to keep said supplementary frames at one end of their travel; and means to reciprocate the display frames.

3. In an advertising device, a case; a series of display frames mounted in the case; supplementary display frames slidably attached to the first named frames; means for limiting the movement of the supplementary display frames and means for reciprocating the first named frames.

4. In an advertising device, a case; display frames mounted in the case; guides for the display frames; auxiliary display frames slidably connected to the first named frames; means for limiting the movement of the auxiliary display frames; a shaft mounted in the case; cranks mounted on the shaft opposite each of the display frames; connecting means between corresponding cranks and display frames; and means to operate the shaft.

5. In an advertising device, a case; display frames mounted in the case; supplementary display frames slidably connected to the top of the display frames; stops for the supplementary display frames; and means for reciprocating the advertising frames.

6. In an advertising device, a case having an exhibition aperture therein; a series of display frames mounted in the case; supplementary display frames attached to the top and bottom of each of the display frames and having a slidable connection therewith; means for restricting the movement of the supplementary display frames after they have passed from behind the exhibition aperture; and means for reciprocating the display frames.

7. In an advertising device, a case having an exhibition aperture therein; display frames mounted in the case; supplementary display frames slidably connected with the display frames; stops on the display frames for the supplementary display frames; stops on the case for the supplementary display frames; a glass plate of irregular cross-section in the aperture of the case; and means to reciprocate the display frames.

8. In an advertising device, a case having an exhibition aperture therein; display frames mounted in the case; supplementary display frames slidably connected with the display frames; stops on the case for the supplementary display frames; stops on the display frames adapted to contact with the supplementary display frames and lock the display frames and the supplementary display frames together; and means for reciprocating the display frames behind the aperture in the case.

9. In an advertising device of the character herein described, the combination of display frames comprising longitudinal U-shaped grooved strips; transverse S-shaped grooved strips attached to the longitudinal strips, the grooves in both strips being adapted to hold display surfaces, together with means for reciprocating the display frames.

10. In a device of the character herein described comprising a case; display surfaces secured in frames operatively mounted in said case; a sectional shaft; adjustable oppositely disposed cranks secured to said shaft; connecting means operatively secured to said cranks and display surfaces; and means to rotate said shaft.

In witness that I claim the foregoing I have hereunto subscribed my name this 16th day of June, 1906.

JOSEPH WESLEY FAWKES.

Witnesses:
TRIMBLE BARKELEW,
G. E. HARPHAM.